United States Patent [19]

Cornell, Jr. et al.

[11] Patent Number: 5,169,259

[45] Date of Patent: Dec. 8, 1992

[54] ADJUSTABLE FOOT INSERT

[76] Inventors: Thomas W. Cornell, Jr., 46 Prospect Dr., Brentwood, N.Y. 11717; John L. Reinbold, 30 Kent St., Farmingdale, N.Y. 11735; Fred W. Eilenberg, 119-20 Union Turnpike, Kew Gardens, N.Y. 11415

[21] Appl. No.: 814,501

[22] Filed: Dec. 30, 1991

Related U.S. Application Data

[63] Continuation of Ser. No. 565,553, Aug. 10, 1990, abandoned.

[51] Int. Cl.⁵ .......................... F16B 7/18; F16M 11/24
[52] U.S. Cl. ..................................... 403/309; 403/344; 403/361; 403/405.1; 248/188.4
[58] Field of Search ................. 403/344, 309-311, 403/313, 340, 282, 345, 361, 405.1, 406.1; 108/157, 144; 248/188.4, 650

[56] References Cited

U.S. PATENT DOCUMENTS

| | | | |
|---|---|---|---|
| 1,201,706 | 10/1916 | Dodge | 403/344 |
| 1,405,342 | 1/1922 | Shaffer | 403/344 |
| 3,150,853 | 9/1964 | Lisbin | 248/188.4 |
| 4,035,095 | 7/1977 | Hughes, Jr. | 403/340 X |
| 4,176,756 | 12/1979 | Gellman | 403/309 X |
| 4,313,586 | 2/1982 | Grzesnikowski | 248/188.4 |
| 5,040,758 | 8/1991 | Giovannetti | 248/188.4 |

Primary Examiner—Peter M. Cuomo
Attorney, Agent, or Firm—Stoll, Previto & Hoffman

[57] ABSTRACT

A foot element with exterior threads on a portion of its surface is die cast or injection molded. Two half sleeves are die cast or injection molded, and are each half cylindrical in shape and have threads on the inside surfaces of the half sleeves and one end is fully or partially closed off. The foot insert can be enclosed between the two sleeve halves and be adjustably extended out from or withdrawn into the completed sleeve.

13 Claims, 2 Drawing Sheets

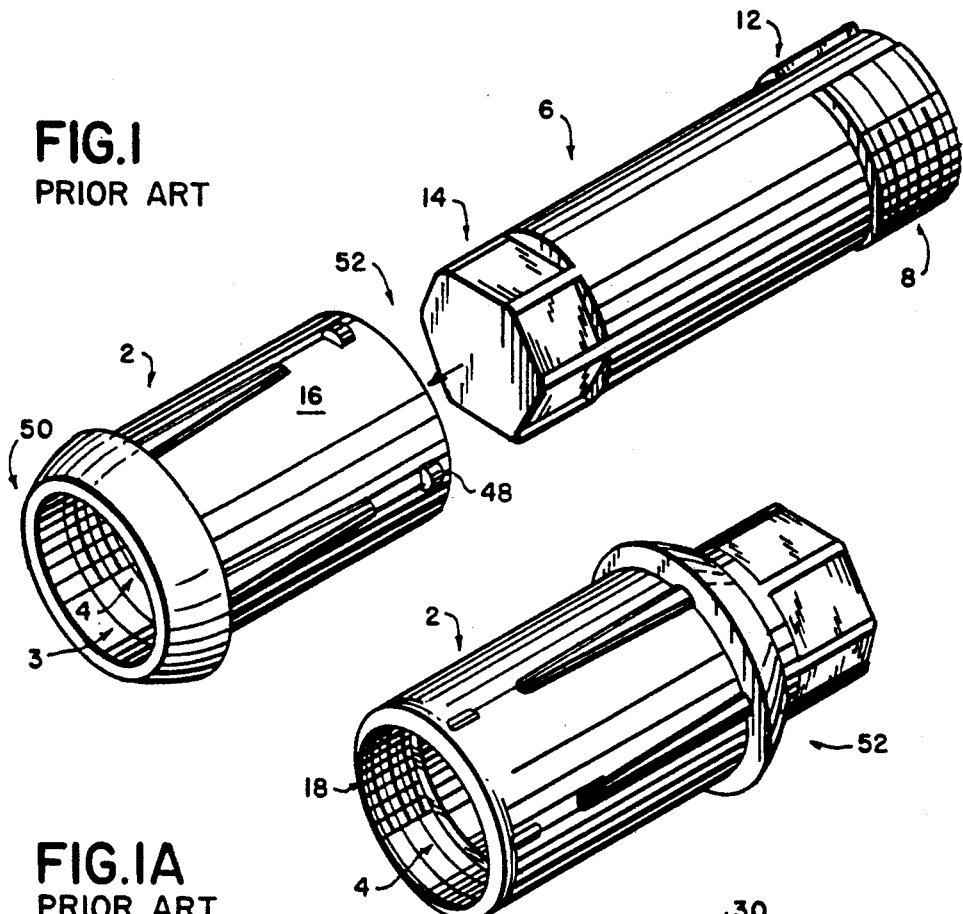
FIG.1 PRIOR ART
FIG.1A PRIOR ART
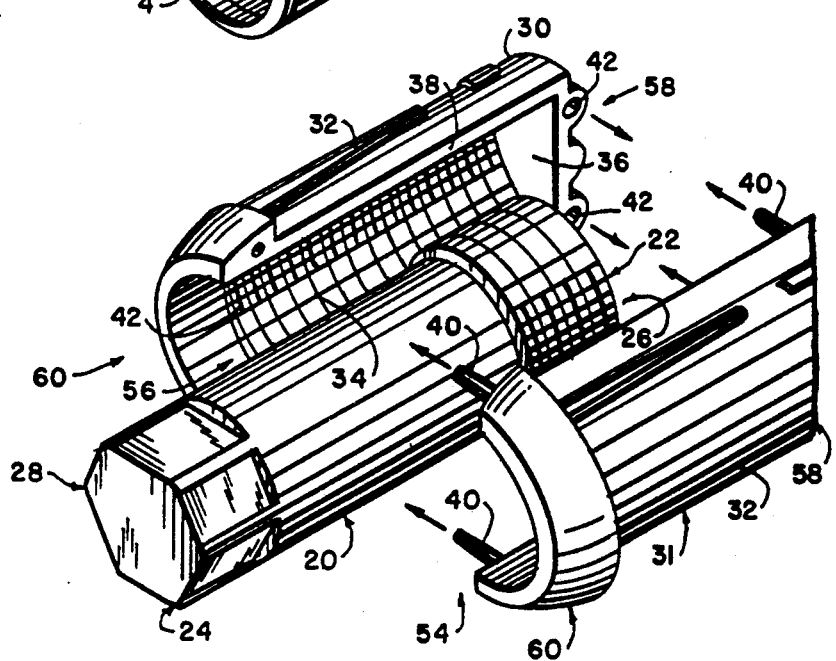
FIG.2

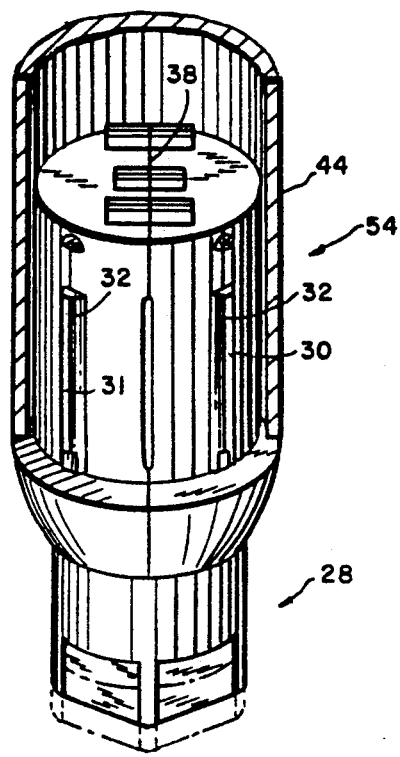
FIG.3
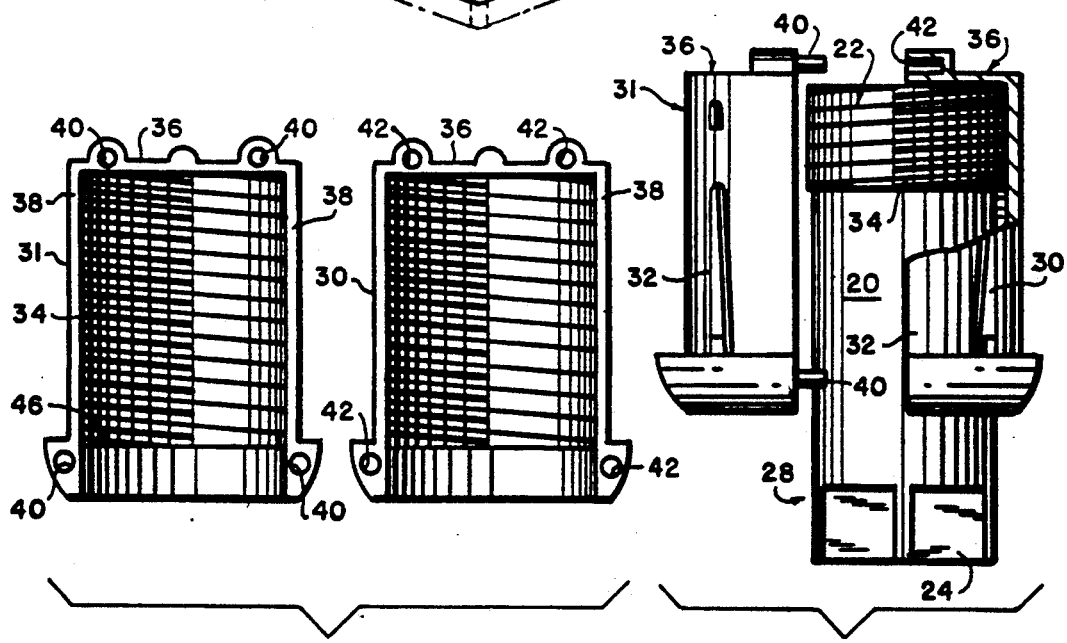
FIG.4 FIG.5

ADJUSTABLE FOOT INSERT

This application is a continuation of pending U.S. application Ser. No. 07/565,553 filed Aug. 10, 1990, now abandoned.

BACKGROUND OF THE INVENTION

1. Field of the Invention

The field of the invention relates to hardware components and, more specifically, an adjustable foot insert for tubing and a method of making such an insert.

2. Description of the Related Art

Adjustable foot inserts widely used in commmercial food service equipment and other situations where it is desirable or required to have legs on tables, components, appliances, etc., that are adjustable. Since it is required by many sanitary codes that devices used to support food service equipment have no exposed threads, an adjustable foot insert was developed which comprises two pieces that are die cast and then assembled. A foot element is die cast in a cylindrical shape, with one end being the bottom and flattened for contact with the floor, and the other end, or top, being threaded. A cylindrical sleeve is then die cast, with a smooth interior. Threads are then tapped or machined onto the interior surface of the sleeve, the foot is threaded into place, and the top portion of the sleeve, opposite the end where the bottom portion of the foot protrudes, is then folded over in a process called swaging. The assembly can then be inserted into the hollow bottom of a leg of the appliance or table to be supported and the height of the appliance can then be adjusted by turning the foot element, thereby lengthening or shortening that leg. These inserts can also be used to compensate for uneven floors and ensure that an appliance or table is level and firmly seated on the floor.

Referring now specifically to the drawings, FIGS. 1-1A show the prior art adjustable foot insert. The prior art adjustable foot insert 52 is manufactured in the following manner. A sleeve element 2 is die cast in a tubular form and has an outside surface 16 and an inside surface 3. After the sleeve 2 is die cast, spiral threads 4 are tapped onto its inside surface 3. This separate tapping process is necessary because threads cannot be easily die cast on the inside of a hollow tube. A foot element 6 is then manufactured according to the prior art, being cylindrical in shape, with a lower end 14 and an upper end 12. The lower end 14 is either round or hexagonal in shape, and is hexagonal in the prior art insert shown in FIGS. 1-1A. The upper end 12 of the foot element 6 is cast with spiral threads 8 on its outside surface. The foot element 6 is then threaded into the upper end 48 of the sleeve element 2, as shown in FIG. 1. The threads 4 that are tapped onto the inside surface 3 of the sleeve element 2 begin at the upper end 48 of the sleeve element 2 and proceed close to, but short of, the lower end 50 of the sleeve element 2. The lower end 14 of the foot element 6 is passed through the upper end 48 of the sleeve element 2 and out of the lower end 50 of the sleeve element 2. The threads 8 of the upper end 12 of the foot element 6 come in contact with the threads 4 of the internal surface 3 of the sleeve element 2, at which point the foot element 6 can be threaded all the way into the sleeve element 2 until the bottom of the threads 8 of the foot element 6 reach the end of the threads 4 in the lower end 50 of the sleeve element 2.

It is important that the foot element 6 be prevented from unscrewing completely from the sleeve element 2 during adjustment of the height of the foot element 6 after installation into the leg of an appliance. Accordingly, after the foot element 6 is threaded into the sleeve element 2, the upper end 48 of the sleeve is rolled over, or swaged, to create a swaged end 18 (FIG. 1A) beyond which the foot element 6 can no longer pass.

The process of making this foot insert is expensive, because the outer sleeve is die cast in one piece. Particularities in the process of die casting make it impractical or impossible to die cast a hollow cylinder with threads on its inside surface, so these threads have to be tapped onto the inside of the tube after it is die cast. Also, it is important to prevent the foot insert from being threaded all the way out of the sleeve in either direction. Preventing the foot from being threaded out of the bottom of the sleeve is done by tapping threads inside of the sleeve close to, but not reaching, the bottom of the sleeve, thus preventing the foot from being lengthened too far. Preventing the foot from being threaded out of the top of the sleeve is more difficult to accomplish. In the known insert, this is done by swaging the upper end of the sleeve after the foot element is threaded into the sleeve, thus preventing the foot from being shortened too far.

The disadvantages to this method of making the insert are that it is time consuming, expensive and inefficient to tap the threads onto the inside of the die cast sleeve, and it is equally disadvantageous to swage the top end of the sleeve after the assembly of the insert.

The method to be disclosed overcomes these disadvantages by eliminating the need for the separate steps of tapping threads and swaging the sleeve, thus allowing a cheaper and more efficient manufacture of the insert.

SUMMARY OF THE INVENTION

The present invention discloses an improved method of making an adjustable foot insert. The improved method involves making the foot element in substantially the same way as in known, with a cylindrical shape, and a flat bottom for contact with the floor and a threaded upper portion. This piece is made in any traditional way, such as by die casting. The sleeve element is, however, not die cast as a hollow cylinder. It is die cast or injection molded in two pieces which combine to form a hollow cylinder, separated by a plane passing through its axis, each piece being half cylindrical in shape. Die casting or injection molding the sleeves in halves allows the threads to be die cast on the inside surface of the half sleeve. Thus, the need for tapping threads onto the inside surface of the sleeve is avoided.

When assembling the insert for use, the foot element is placed in one of the pieces, or half sleeves, and the other half sleeve is then placed over the foot element, so that the two half sleeves enclose the foot element.

This method of assembly also eliminates the need for swaging the top end of the sleeve. Each half sleeve is die cast or injection molded with the top end fully or partially closed or restricted. This is made possible because the foot element does not need to be threaded into the sleeve from the top during assembly. When the insert is assembled, the foot element is prevented from being shortened too far by the fully or partially closed off top of the half sleeves. The foot element is prevented from being lengthened too far by the known method of discontinuing the interior threads of the sleeves before the threads reach the bottom edge of the sleeve.

The sleeves are preferably die cast with pins and alignment holes on the surfaces along the edges of the abutment plane between the half sleeves. These pins and alignment holes prevent movement of one half sleeve relative to the other half sleeve along the plane separating the two half sleeves and assure proper alignment of the threads on the inside of each half sleeve. The alignment pins and holes can be made with an interference fit, allowing the two half sleeves to be pressed together in the assembly to hold them together tightly. Any other method of aligning and holding the two half sleeves tightly together after assembly can be used, such as, for example, ribs fittings into slots, flanges fitting into recesses, or fasteners such as screws, rivets, spun over or rivetted cast studs external springs clips or clamps. Further, and in addition to the previously described method of fastening the two half-sleeves together, once the assembled insert is installed in the end of a leg of a table or appliance, the leg holds the two half sleeves together and prevents them from spreading.

Thus, the disclosed method of manufacture avoids the need for tapping threads on the inside of the sleeve, and also avoids swaging, thus making the manufacturing process cheaper, simpler, and more efficient.

Also encompassed by the invention is the adjustable foot insert itself. Such an insert is easier and less expensive to manufacture and has a generally cleaner look. The insert consists of a cylindrical foot positioned between two halves of a sleeve assembly and threads are provided to permit the foot to be extended out from, or inserted into, the sleeve.

BRIEF DESCRIPTION OF THE DRAWINGS

A detailed description of the invention follows, with reference to the accompanying figures in which:

FIG. 1 is an exploded perspective view of the prior art adjustable foot insert;

FIG. 1A is a perspective view of the prior art adjustable foot insert;

FIG. 2 is an exploded perspective view of the adjustable foot insert according to the invention;

FIG. 3 is a partially cut away elevational side view of the adjustable foot insert, according to the invention, in its environment;

FIG. 4 is a side by side view of the sleeve elements of the adjustable foot insert, according to the invention.

FIG. 5 is a partially broken away side elevation view of the adjustable foot insert, according to the invention.

DETAILED DESCRIPTION OF THE INVENTION

With reference now to FIGS. 2-5, the preferred embodiments of the invention will now be disclosed.

The adjustable foot insert 54, according to the invention, is manufactured by die casting or injection molding a foot element 20 which is substantially identical to the foot element 6 of the prior art adjustable foot insert 52, and has an upper end 26 and a lower end 28. It is preferred that the lower end 28 be a hexagonal bottom 24, as shown by FIG. 2, to allow easy adjustment after installation through the use of a wrench, but it may be made in any desired shape. The upper end 26 is die cast or injection molded with spiral threads 22, on its outer surface, directed externally, as in the prior art foot element 6 (FIG. 1).

The sleeve for the foot element 20, according to the invention, is die cast or injection molded in two parts, or half sleeve elements, 30 and 31 (FIG. 3).

Each half sleeve element 30, 31 is die cast or injection molded with spiral threads 34 on its inner surface 56. This die cast or injection molded threading is made possible by manufacturing the sleeve in halves. Each half sleeve element 30, 31 also has an upper end 58 and a lower end 60. The half sleeve elements 30, 31 each have a fully or partially closed off top 36 at the upper ends 58. The threads 34 die cast or molded on the inner surface 56 of the half sleeve elements 30, 31 stop short of reaching the lower end 60 of the half sleeve elements 30, 31. The half sleeve elements 30, 31 are separated by a contact surface 38 which runs through a plane passed through the cylinder axis of the half sleeve elements when they are assembled. One half sleeve element 31 is manufactured with a series of locator pins 40 on its contact surface 38, while the other half sleeve element 30 has a series of corresponding locator or alignment holes 42 on its contact surface 38. These pins 40 and alignment holes 42 prevent movement of one half sleeve relative to the other half sleeve along the plane separating the two half sleeves and assure proper alignment of the threads on the inside of each half sleeve. It is also possible to place both locator pins and alignment holes on each half sleeve element. Any other method of aligning and holding the two half sleeve elements tightly together after assembly can be used, such as, for example, ribs fitting into slots, flanges fitting into recesses, or fasteners such as screws, rivets, spun over or rivetted cast studs or external clips or clamps. The adjustable foot insert 54, according to the invention, can then be assembled by placing the foot element 20 into one of the half sleeve elements, as shown in FIG. 2, so that the threads 22 of the foot element 20 are threadably engaged with the threads 34 of the half sleeve element, and the hexagonal bottom 24 of the foot element 20 protrudes from the lower end 60 of the half sleeve element. The other half sleeve element is then positioned adjacent to the first half sleeve element so that the locator pins 40 of one half sleeve element enter the corresponding locator holes 42 of the other half sleeve element, and the half sleeve elements 30, 31 meet at their contact surfaces 38. Preferably, the locator holes 42 are of a smaller diameter than the corresponding locator pins 40 so that the half sleeve elements, when pressed together, are held tightly together in an interference fit or press fit and in contact at their contact surfaces 38. The threads 34 of both half sleeve elements will then be threadably engaged with the threads 22 of the foot element 20. When the assembled adjustable foot insert 54 is inserted into a round leg 44 (FIG. 3), the outer surfaces 32 of the half sleeve elements 30, 31 come into contact with the inside surface of the round leg 44, so that the half sleeve elements 30, 31 are held together and no spreading between them can occur.

During adjustment of the height of the adjustable foot insert 54 by rotation or threading of the foot element 20, the foot element 20 is prevented from being shortened too much by the fully or partially closed off top 36 of the half sleeve elements 30, 31. The foot element 20 is also prevented from being lengthened too far by the end 46 of the threads 34 which are die cast or molded in the half sleeve elements 30, 31.

The disclosed method allows the construction of the adjustable foot insert in a cheaper, more efficient manner by avoiding the costly processes of tapping or machining the interior threads onto the cylindrical sleeve and swaging the upper end of the sleeve after assembly.

It should be noted that the lower end 28 of the foot element 20 can be hexagonal, round, or any other shape that the required use dictates. The adjustable foot insert 54, according to the invention, can also be made in varying lengths and diameters to meet a wide variety of uses. Also, it should be noted that the method disclosed and the resulting apparatus are not limited to die cast metals, and could be made with, for example, a zinc alloy, aluminum alloy or magnesium or copper based alloy.

While the invention has been described in conjunction with a specific embodiment of the adjustable foot insert and its manufacture, it should be understood that this is merely illustrative. Numerous modifications may be made to the assembly, and the elements used, and the method of manufacture used without departing from the spirit or scope of the invention and it is intended that the patent shall cover whatever features and methods of patentable novelty that exist in the invention and are encompassed within the following claims.

We claim:

1. An adjustable foot insert assembly for attachment to a leg or similar article to lengthen or shorten it comprising:
   a foot element having a cylindrical exterior surface, an upper end and a lower end, said lower end adapted to contact a floor or similar support surface, said exterior surface of said foot element adjacent said upper end having threads between said upper and lower ends;
   a sleeve element assembly comprising a first sleeve element and a second sleeve element assembled together, each said first and second sleeve elements having the shape of a hollow half cylinder and having an upper end and a lower end,
   said upper ends of said first and second sleeve elements being at least partially closed off, the distance between the at least partially closed off upper ends of the assembled first and second sleeve elements being less than the diameter of the exterior surface of the foot element.
   said first and second sleeve elements each having an internal surface having spiral threads between said upper and lower ends corresponding to said threads of said exterior surface of said foot element,
   said foot element being enclosed and threadably engaged between said first and second sleeve elements and rotatable relative thereto in one direction or the other with the upper end of the foot element located between the upper and lower ends of the first and second sleeve elements and the lower end of the foot element extending beyond the lower ends of the first and second sleeve elements,
   whereby rotation of the foot element relative to the first and second sleeve elements in one direction will axially move the foot element relative to the first and second sleeve elements to cause the lower end of the foot element to extend beyond the lower ends of the first and second sleeve elements for a greater distance to thereby lengthen the leg or similar article to which the adjustable foot insert assembly is attachable, and rotation of the foot element relative to the first and second sleeve elements in the other direction will axially move the foot element relative to the first and second sleeve elements to cause the lower end of the foot element to extend beyond the lower ends of the first and second sleeve elements for a lesser distance to thereby shorten the leg or similar article to which the adjustable foot insert assembly is attachable.

2. An adjustable foot insert according to claim 1, further comprising means for locating and fastening said first sleeve element relative to said second sleeve element.

3. An adjustable foot insert according to claim 2, wherein said threads of said internal surfaces of said sleeve elements end before reaching said lower end of said sleeve elements.

4. An adjustable foot insert according to claim 3, wherein each said sleeve element also has an abutment surface where contact is made with said other sleeve element, and wherein said locating and fastening means comprises a plurality of pins along said abutment surface, of said first sleeve element, and a plurality of holes along said abutment surface of said second sleeve element, equal in number to said plurality of pins of said first sleeve element, and correspondingly positioned, so that said pins of said first sleeve element can be inserted into said holes of said second sleeve element.

5. An adjustable foot insert according to claim 4, wherein said pins and holes are tapered and have a press fit, so that when said sleeve elements are pressed together, they are held tightly together.

6. An adjustable foot insert according to claim 2, wherein each said sleeve element also has an abutment surface where contact is made with said other sleeve element, and wherein said locating and fastening means comprises a plurality of pins along said abutment surface of said first sleeve element, and a plurality of holes along said abutment surface of said second sleeve element, equal in number to said plurality of pins of said first sleeve element, and correspondingly positioned, so that said pins of said first sleeve element can be inserted into said holes of said second sleeve element.

7. An adjustable foot insert according to claim 6, wherein said pins and holes are tapered and have a press fit, so that when said sleeve elements are pressed together, they are held tightly together.

8. An adjustable foot insert according to claim 1 wherein the upper ends of the sleeve elements are closed off.

9. A method of manufacturing an adjustable foot insert assembly for attachment to a leg or similar article to lengthen or shorten it comprising the following steps:
   manufacturing a foot element having a lower end adapted to contact a floor or similar support surface an upper end and a cylindrical external surface with spiral threads between said upper and lower ends;
   manufacturing a sleeve element assembly comprising a first sleeve element and a second sleeve element for assembly together, each having an upper and a lower end and each being in the shape of a hollow half cylinder and having an abutment surface therebetween, internal spiral threads between said upper and lower ends, and means for locating and fastening said first sleeve element relative to said second sleeve element;
   at least partially closing off the upper ends of said first and second sleeve elements so that the distance between the at least partially closed off upper ends of the assembled first and second sleeve elements is less than the diameter of the external surface of the foot element;

placing said foot element inside said first sleeve element so that said external threads of said foot element are threadably engaged with said internal threads of said first sleeve element and rotatable relative thereto in one direction or the other so that the upper end of the foot element is located between said upper and lower ends of the first sleeve element and the lower end of the foot element extends beyond the lower end of the first sleeve element; and placing said second sleeve element relative to said first sleeve element so that said external threads of said foot element are threadably engaged with said internal threads of said second sleeve element and rotatable relative thereto in one direction or the other so that the upper end of the foot element is located between said upper and lower ends of the second sleeve element and the lower end of the foot element extends beyond the lower end of the second sleeve element, said locating and fastening means being engaged to maintain said first sleeve element in assembled position relative to said second sleeve element, whereby rotation of the foot element relative to the assembled first and second sleeve elements in one direction will axially move the foot element relative to the assembled first and second sleeve elements to cause the lower end of the foot element to extend beyond the lower ends of the assembled first and second sleeve elements for a greater distance to thereby lengthen the leg or similar article to which the adjustable foot insert assembly is attachable, and rotation of the foot element relative to the assembled first and second sleeve elements in the other direction will axially move the foot element relative to the assembled first and second sleeve elements to cause the lower end of the foot element to extend beyond the lower ends of the assembled first and second sleeve elements for a lesser distance to thereby shorten the leg or similar article to which the adjustable foot insert assembly is attachable.

10. A method of manufacturing an adjustable foot insert as claimed in claim 9 wherein said foot element and said first and second sleeve elements are manufactured by die casting.

11. A method of manufacturing an adjustable foot insert as claimed in claim 9 wherein said foot element and said first and second sleeve elements are manufactured by injection molding.

12. A method of manufacturing an adjustable foot insert assembly as claimed in claim 9 wherein the at least partially closing off of the upper ends of said sleeve elements is formed integral and simultaneously with the manufacture of said first and second sleeve elements.

13. A method of manufacturing an adjustable foot insert assembly according to claim 12 wherein the upper ends of the sleeve elements are closed off.

* * * * *